(12) United States Patent
Tsai et al.

(10) Patent No.: US 8,901,833 B2
(45) Date of Patent: Dec. 2, 2014

(54) LED DRIVING CIRCUIT PREVENTING LIGHT LEAKAGE ISSUE

(75) Inventors: Yu Tsai, Minxiong Township (TW); Che-Yu Chuang, Huatan Township (TW)

(73) Assignee: Hannstar Display Corporation, Taipei (TW)

( * ) Notice: Subject to any disclaimer, the term of this patent is extended or adjusted under 35 U.S.C. 154(b) by 434 days.

(21) Appl. No.: 13/342,712

(22) Filed: Jan. 3, 2012

(65) Prior Publication Data

US 2013/0076254 A1 Mar. 28, 2013

(30) Foreign Application Priority Data

Sep. 27, 2011 (TW) ............... 100134927 A

(51) Int. Cl.
*H05B 41/00* (2006.01)
*H05B 33/08* (2006.01)

(52) U.S. Cl.
CPC ........... *H05B 33/0818* (2013.01); *Y02B 20/346* (2013.01)
USPC .................. 315/192; 709/72; 345/30; 345/39; 345/82

(58) Field of Classification Search
CPC ........... H05B 33/0815; H05B 33/0818; H05B 37/02; H05B 33/0827; H05B 33/0887; H05B 33/0842; H05B 33/089; H05B 33/0803; H05B 33/0809; H05B 33/0839; H05B 33/0848; H05B 33/0851; H05B 33/0884; H05B 33/0824
USPC ............................ 315/72, 192; 345/30, 39, 82
See application file for complete search history.

(56) References Cited

U.S. PATENT DOCUMENTS

| | | | |
|---|---|---|---|
| 7,777,430 B2 * | 8/2010 | Catalano et al. | 315/309 |
| 8,111,007 B2 * | 2/2012 | Chung et al. | 315/291 |
| 2007/0115248 A1 | 5/2007 | Roberts et al. | |
| 2010/0045210 A1 * | 2/2010 | Hariharan | 315/297 |
| 2010/0102727 A1 * | 4/2010 | Lee | 315/82 |
| 2010/0301761 A1 * | 12/2010 | Liao et al. | 315/186 |

FOREIGN PATENT DOCUMENTS

| | | |
|---|---|---|
| CN | 2659080 Y | 11/2004 |
| CN | 101267695 A | 9/2008 |
| CN | 101605415 A | 12/2009 |
| CN | 201509341 U | 6/2010 |
| CN | 101778510 A | 7/2010 |

(Continued)

OTHER PUBLICATIONS

"Office Action of China Counterpart Application", issued on May 8, 2014, p. 1-p. 6.

(Continued)

*Primary Examiner* — Douglas W Owens
*Assistant Examiner* — Monica C King
(74) *Attorney, Agent, or Firm* — Jianq Chyun IP Office

(57) ABSTRACT

A light emitting diode (LED) driving circuit preventing light leakage issue. The LED driving circuit comprises an LED driver, a driving circuit module and a power supply. When an input voltage is much higher, a high frequency pulse width modulation signal is set to a low level to avoid a light leakage of the LED by turning off a metal oxide semiconductor field effect transistor (MOSFET), such that the input voltage is not limited by the light leakage of the LED. As a result, the input voltage can be increased sufficiently for further reducing a switching loss effectively.

10 Claims, 4 Drawing Sheets

(56) References Cited

FOREIGN PATENT DOCUMENTS

| | | |
|---|---|---|
| CN | 102065596 A | 5/2011 |
| CN | 102118903 A | 7/2011 |
| JP | 2005-318787 | 11/2005 |
| TW | M391244 | 10/2010 |
| TW | 201044916 | 12/2010 |

OTHER PUBLICATIONS

"Office Action of Taiwan Counterpart Application", issued on Nov. 26, 2013, p. 1-p. 8.

* cited by examiner

LED DRIVING CIRCUIT PREVENTING LIGHT LEAKAGE ISSUE

CROSS-REFERENCE TO RELATED APPLICATION

This application claims the benefit of priority to Taiwan Patent Application No. 100134927, filed on Sep. 27, 2011, in the Taiwan Intellectual Property Office, the disclosure of which is incorporated herein in its entirety by reference.

BACKGROUND OF THE INVENTION

1. Field of the Invention

The present invention relates to a light emitting diode (LED) driving circuit, in particular to the LED driving circuit having a metal oxide semiconductor field effect transistor (MOSFET) to improve an input voltage significantly without being limited by the issue of a light leakage.

2. Description of the Related Art

With reference to FIG. 1 for a schematic block diagram of a conventional LED driving circuit, the conventional LED driving circuit comprises an LED driver 12, a driving circuit module 13 and a power supply 14. The LED driver 12 and the driving circuit module 13 of the conventional LED driving circuit are electrically coupled to an LED module 11. The LED driver 12 and the power supply 14 are electrically coupled to each other. The LED driver 12 is provided for receiving a current from the power supply 14 to generate a voltage. The LED module 11 comprises a plurality of light emitting diodes 111. The LED driver 12 comprises at least an enable pin (EN) 121 for receiving a high frequency pulse width modulation (PWM) signal to drive the driving circuit module 13, and the driving circuit module 13 further drives the LED module 12 to achieve illumination.

In the aforementioned conventional circuit architecture, the switching loss is directly proportional to the boost conversion ratio. In other words, the higher the boost conversion ratio, the greater the switching loss would be. To reduce the switching loss, it is necessary to increase the input voltage in order to lower the boost conversion ratio.

However, with a higher input voltage, while the high frequency pulse width modulation signal transmitted from the enable pin 121 is at a low level the forward bias would be significantly high to produce a current passing through the LED module 11, which will lead to light leakage of the LED 111. In order to avoid the light leakage of the LED 111, the input voltage is limited and cannot be sufficiently increased to reduce the switching loss effectively. The aforementioned issues remain to be solved.

SUMMARY OF THE INVENTION

In view of the shortcomings of the prior art, the inventor of the present invention based on years of experience in the related industry to conduct extensive researches and experiments, and finally developed an LED driving circuit to overcome the shortcomings of the prior art.

It is a primary objective of the present invention to provide an LED driving circuit having a MOSFET.

Another objective of the present invention is to provide an LED driving circuit having an input voltage not limited by the light leakage issue, so that the input voltage can be increased greatly.

A further objective of the present invention is to provide an LED driving circuit capable of reducing a switching loss effectively.

To achieve the foregoing objectives, the present invention provides an LED driving circuit at least comprising an LED driver, a driving circuit module and a power supply. The LED driver comprises a first enable pin, a driving circuit module including a MOSFET electrically coupled to a second enable pin, and an LED module, the LED driver and the driving circuit module of the LED driving circuit are electrically coupled to one another, and the LED driver and the power supply are electrically coupled to each other, and the first enable pin is provided for receiving a high frequency pulse width modulation signal to drive the driving circuit module, and the driving circuit module further drives the LED module to emit light, and the second enable pin is also provided for receiving the high frequency pulse width modulation signal.

With the LED driving circuit of the present invention, even if the input voltage is increased much higher then the conventional design, since the high frequency pulse width modulation signal received by the second enable pin is at a low level, the MOSFET will be turned off, so that the LED driving circuit would stop driving of the LED module, and therefore the LED module will not produce a light leakage. Thus, the input voltage will not be limited by the light leakage, and the input voltage can be sufficiently increased to reduce the switching loss effectively.

To make it easier to further understand the technical characteristics and effects of this invention, preferred embodiments accompanied by related drawings are described as follows.

DETAILED DESCRIPTION OF THE PREFERRED EMBODIMENTS

The technical characteristics of the present invention will become clear with the detailed description of the preferred embodiments accompanied with the illustration of related drawings as follows. It is noteworthy to point out that same numerals are used for representing respective elements for the description of the preferred embodiments and the illustration of the drawings.

Figure 1:
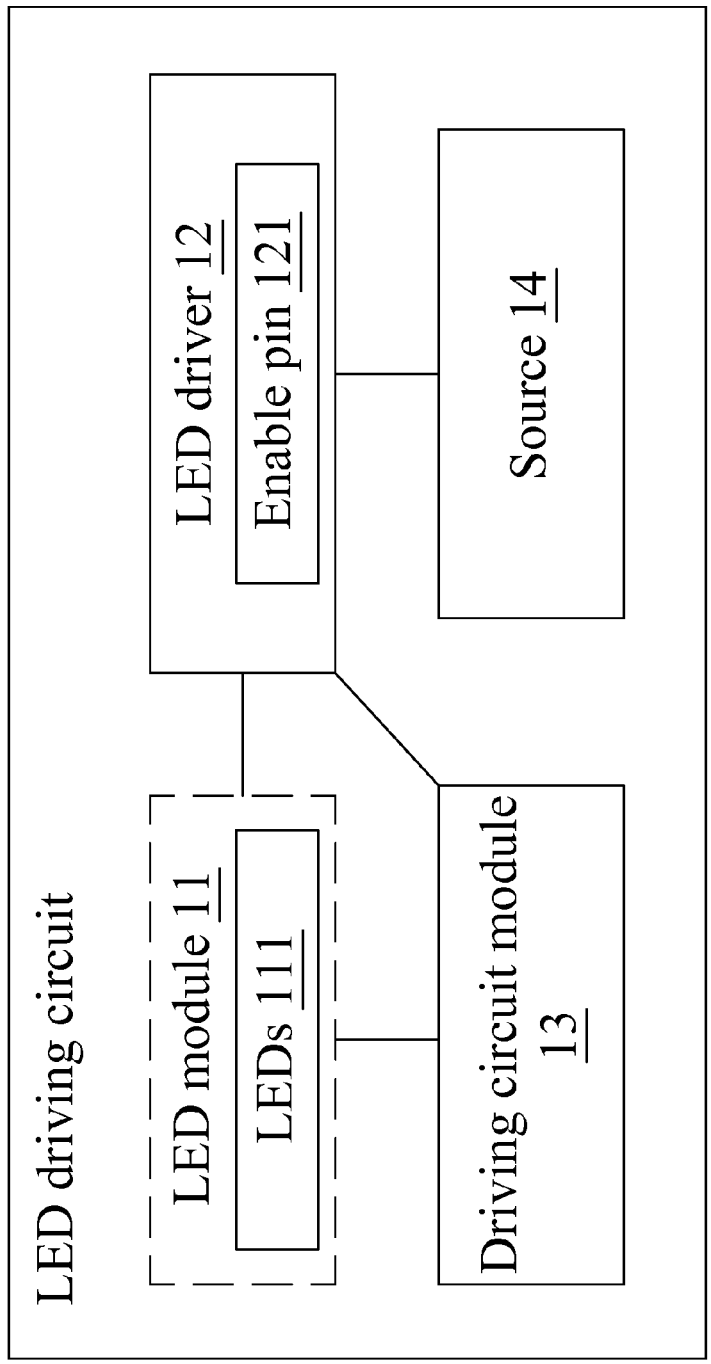
FIG. 1 is a schematic block diagram of a conventional LED driving circuit.
Figure 2:
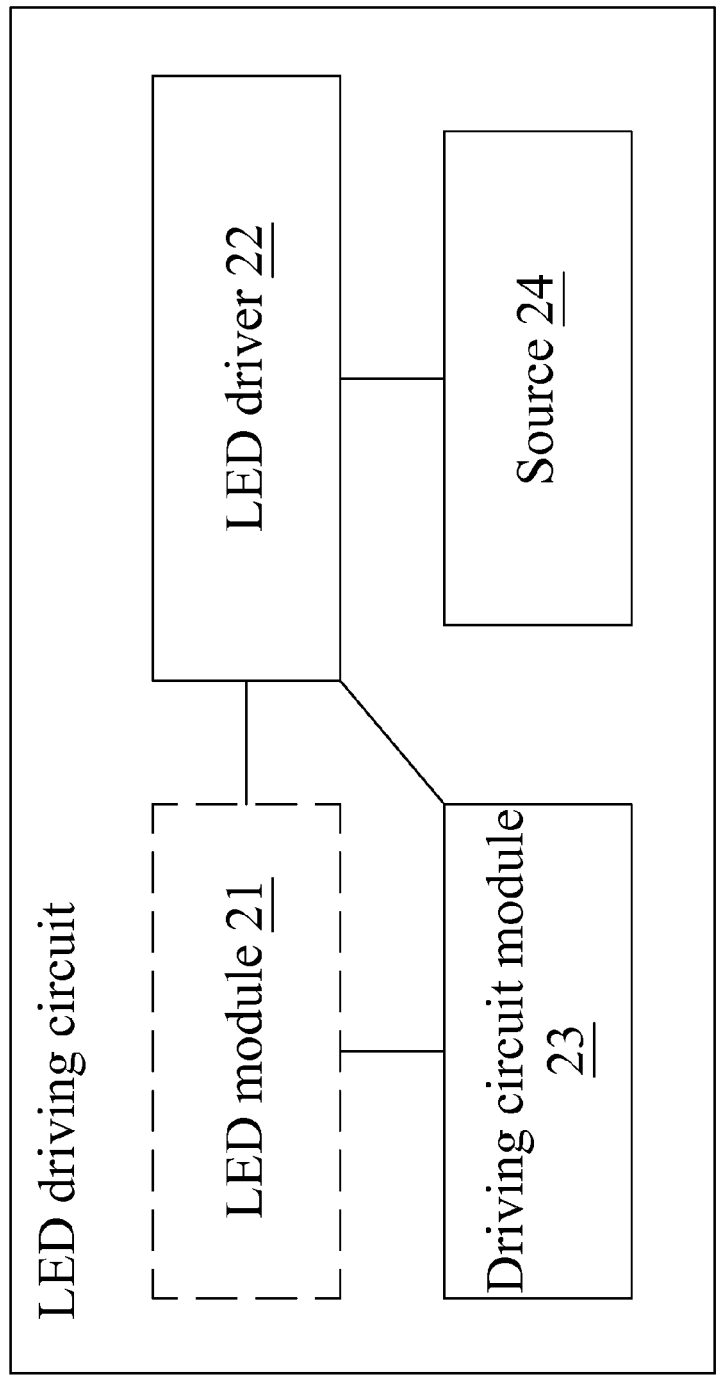
FIG. 2 is a schematic block diagram of an LED driving circuit of the present invention.

With reference to FIG. 2 for a schematic block diagram of an LED driving circuit of the present invention, the LED driving circuit comprises an LED driver 22, a driving circuit module 23 and a power supply 24. The LED driver 22 and the driving circuit module 23 of the LED driving circuit are electrically coupled to an LED module 21. The LED driver 22 and the power supply 24 are electrically coupled to one another. The LED driver 22 is provided for receiving a current from the power supply 24 to generate a voltage, and the LED driver 22 drives the driving circuit module 23, and the driving circuit module 23 drives the LED module 21 to emit light.

Figure 3:
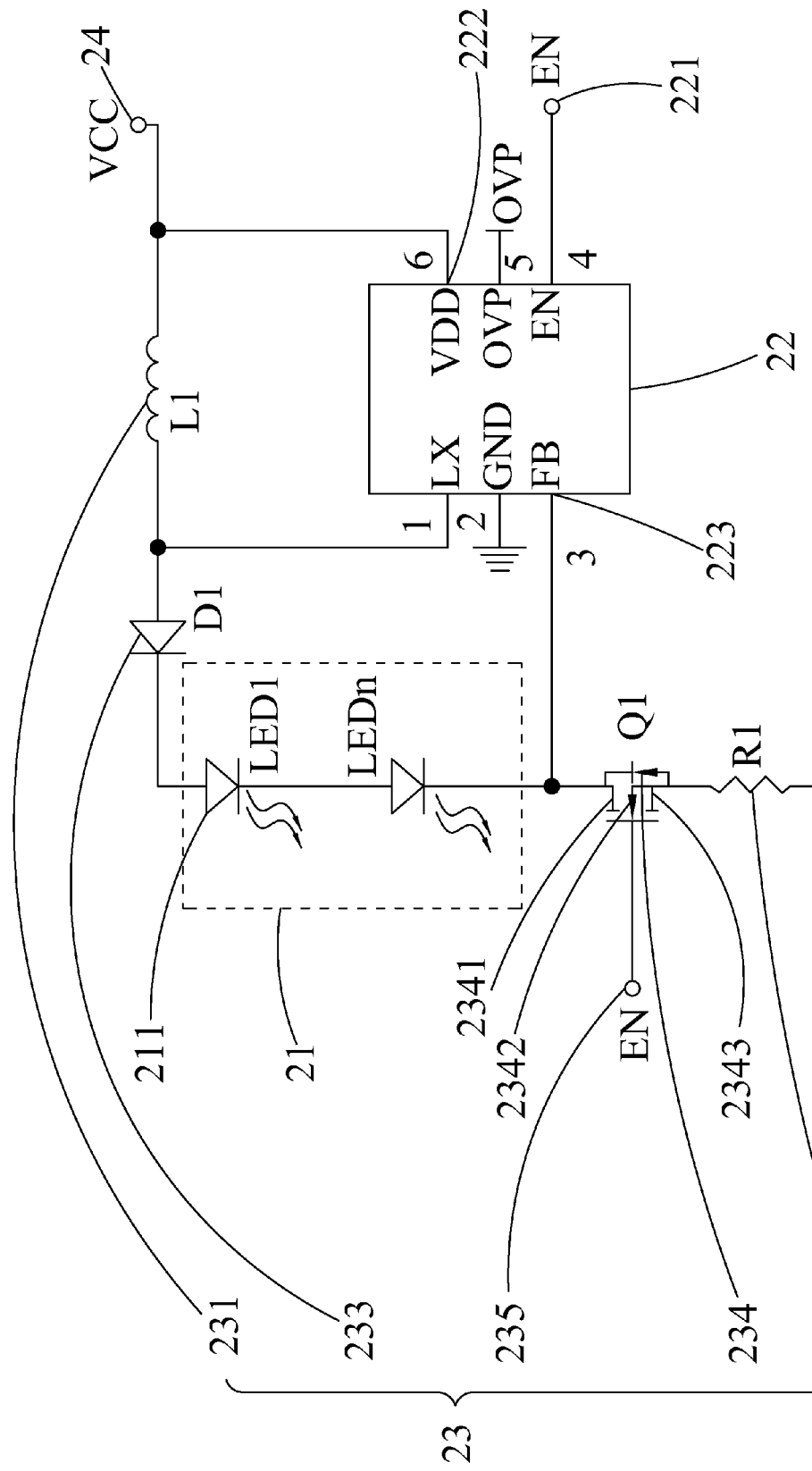
FIG. 3 is a schematic view of an LED driving circuit in accordance with a preferred embodiment of the present invention.

With reference to FIG. 3 for a schematic view of an LED driving circuit in accordance with a preferred embodiment of the present invention, the LED driving circuit comprises an LED driver 22, a driving circuit module 23 and a power supply 24. An LED module is coupled to the driving circuit module. The LED module 21 comprises a plurality of LEDs 211 electrically coupled in series with one another. The LED driver 22 at least comprises a first enable pin (EN) 221, a positive voltage pin (VDD) 222 and a feedback signal pin (FB) 223. The driving circuit module 23 at least comprises an inductor (L1) 231, a resistor (R1) 232, a rectifier diode (D1) 233 and a metal oxide semiconductor field effect transistor (MOSFET,Q1) 234. The MOSFET 234 has a drain 2341, a gate 2342, and a source 2343. The gate 2342 and the second enable pin (EN) 235 are electrically coupled with each other. The resistor (R1) 232 may be a fixed resistor or a variable resistor.

The positive voltage pin 222 of the LED driver 22 is electrically coupled to the power supply 24. The feedback signal pin 223 of the LED driver 22, an end of the LED module 21, the MOSFET 234 and the resistor 232 are electrically coupled in series. The MOSFET 234 is electrically coupled in series between the feedback signal pin 223 and the resistor 232. The other end of the LED module 21, the rectifier diode 233, the inductor 231 and the power supply 24 are electrically coupled in series. The rectifier diode 233 is electrically coupled in series between the other end of the LED module 21 and the inductor 231, and the LED driver 22 and the inductor 231 are electrically coupled in parallel.

The first enable pin 221 is provided for receiving a high frequency pulse width modulation signal to drive the driving circuit module 23, and the driving circuit module 23 further drives the LED module 21 to emit light. The second enable pin 235 is also provided for receiving the high frequency pulse width modulation signal.

With the LED driving circuit of the present invention, even if the input voltage is sufficiently increased to reduce the switching loss, as usual, the high frequency pulse width modulation signal received by the first enable pin 221 is at a high level (3.3 V), the driving circuit module 23 will be driven, and the driving circuit module will further drive the LED module 21 to emit light. However, when the high frequency pulse width modulation signal received by the first enable pin 221 is at a low level (0 V), the second enable pin 235 also will receive the high frequency pulse width modulation signal of a low level (0 V), and the MOSFET 234 will be turned off, and the LED driving circuit would stop driving of the LED module, and therefore the LED module 21 will not produce a light leakage.

Figure 4:
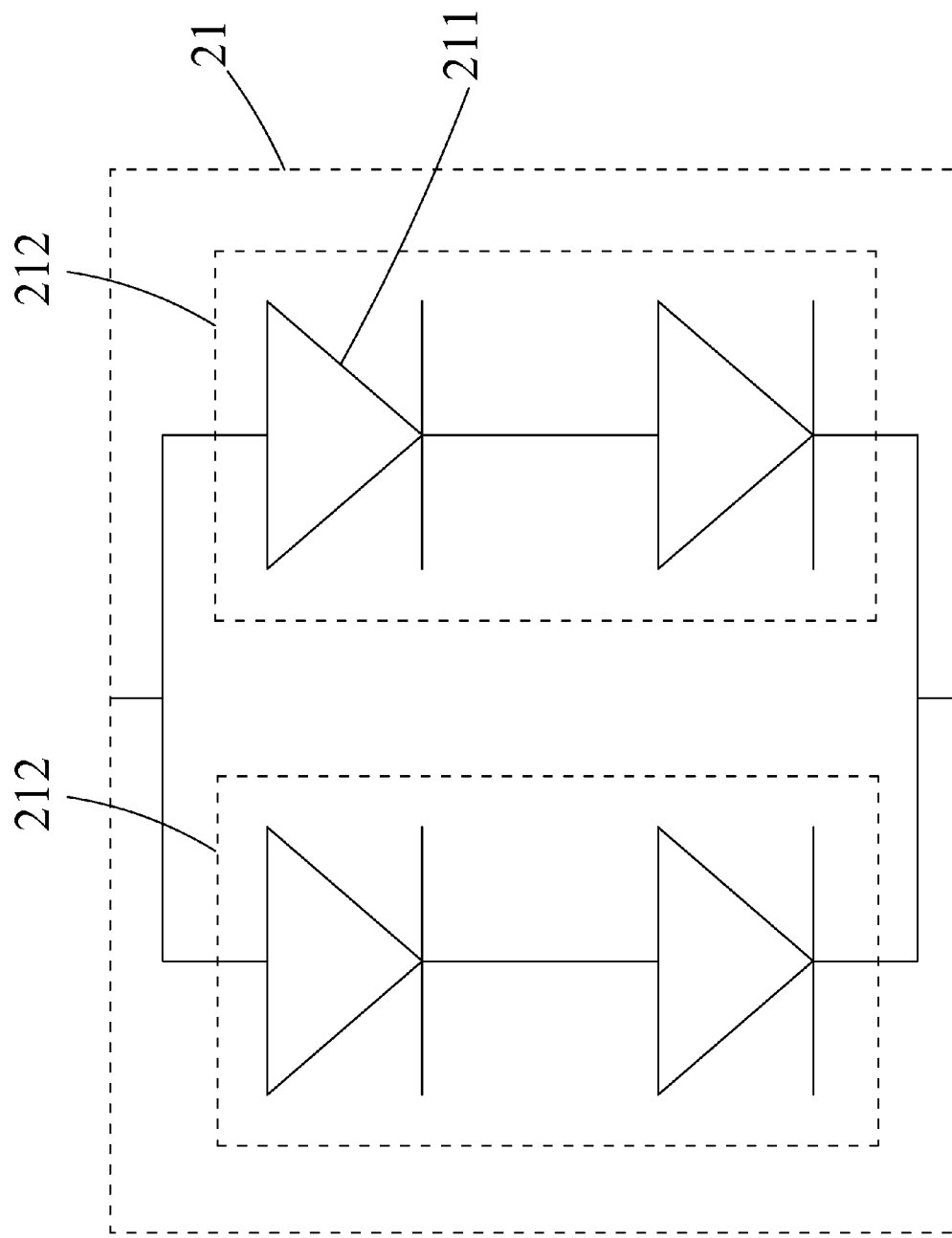
FIG. 4 is a schematic view of an LED driving circuit in accordance with another preferred embodiment of the present invention.

With reference to FIG. 4 for a schematic view of an LED driving circuit in accordance with another preferred embodiment of the present invention, the LED module 21 comprises a plurality of LEDs 211 electrically coupled in series, and a plurality of LED strings 212 can be electrically coupled in parallel. The way of electrical coupling of the LEDs 211 may vary with design requirements, and this embodiment is provided for illustrating the present invention, but not intended for limiting the scope of the invention.

It is noteworthy to further point out that the LED driver 22, the power supply 24, inductor (L1) 231 and the rectifier diode (D1) 233 are considered as a boost circuit architecture. Persons ordinarily skilled in the art can understand the components easily, and thus will not be described.

In summation of the description above, the LED driving circuit of the present invention at least has the following advantage:

With the driving circuit structure of the present invention, the LED module will not produce a light leakage even if the input voltage is much higher due to the high frequency pulse width modulation signal received by the second enable pin is at a low level, so that the MOSFET will be turned off, and the LED driving circuit would stop driving of the LED module. Therefore, the input voltage will not be limited by the light leakage. In other words, the input voltage can be sufficiently increased to reduce the switching loss effectively.

While the invention has been described by means of specific embodiments, numerous modifications and variations could be made thereto by those skilled in the art without departing from the scope and spirit of the invention set forth in the claims.

What is claimed is:

1. A light emitting diode (LED) driving circuit applicable to an LED module, comprising:
    an LED driver, comprising a first enable pin;
    a driving circuit module, comprising a metal oxide semiconductor field effect transistor (MOSFET), and a gate of the MOSFET being electrically coupled to a second enable pin; and
    a power supply;
    wherein the LED module, the LED driver and the driving circuit module are electrically coupled to each other, and the LED driver and the power supply are electrically coupled to each other, and the first enable pin is provided for receiving a high frequency pulse width modulation signal to drive the driving circuit module, and the driving circuit module further drives the LED module to emit light, and the second enable pin is provided for receiving the high frequency pulse width modulation signal,
    wherein the LED driver further includes a feedback signal pin, the driving circuit module further includes a resistor, and the feedback signal pin of the LED driver, an end of the LED module, the MOSFET, and the resistor are electrically coupled in series, and the MOSFET is electrically coupled in series between the feedback signal pin and the resistor,
    wherein when the MOSFET is turned off in response to the high frequency pulse width modulation signal, the LED driving circuit stops driving the LED module and then the LED module does not produce a light leakage.

2. The LED driving circuit of claim 1, wherein the LED module includes a plurality of LEDs connected in series.

3. The LED driving circuit of claim 1, wherein the LEDs are connected in series to form at least one LED string, and when there are more than one of the LED strings, the LED strings are connected in parallel to form the LED module.

4. The LED driving circuit of claim 1, wherein the LED driver further includes a positive voltage pin.

5. The LED driving circuit of claim 1, wherein the driving circuit module is driven to further drive the LED module to emit light when the high frequency pulse width modulation signal received by the first enable pin is at a high level, and the second enable pin also receives the high frequency pulse width modulation signal to turn off the MOSFET when the high frequency pulse width modulation signal received by the first enable pin is at a low level.

6. The LED driving circuit of claim 4, wherein the driving circuit module further includes an inductor and a rectifier diode.

7. The LED driving circuit of claim 6, wherein the resistor is a fixed resistor.

8. The LED driving circuit of claim 6, wherein the resistor is a variable resistor.

9. The LED driving circuit of claim 6, wherein the positive voltage pin of the LED driver is electrically coupled to the power supply.

10. The LED driving circuit of claim 9, wherein the other end of the LED module, the rectifier diode, the inductor and the power supply are electrically coupled in series, and the rectifier diode is electrically coupled in series between the other end of the LED module and the inductor, and the LED driver and the inductor are electrically coupled in parallel.

\* \* \* \* \*